(12) United States Patent
Schmieder et al.

(10) Patent No.: US 7,889,203 B2
(45) Date of Patent: Feb. 15, 2011

(54) ENCODING FOR REMOTING GRAPHICS TO DECODER DEVICE

(75) Inventors: Wilhelm R. Schmieder, Issaquah, WA (US); Ido Ben-Shachar, Kirkland, WA (US); Joy Chik, Sammamish, WA (US); John E. Parsons, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 871 days.

(21) Appl. No.: 10/970,904

(22) Filed: Oct. 22, 2004

(65) Prior Publication Data

US 2006/0087512 A1 Apr. 27, 2006

Related U.S. Application Data

(63) Continuation of application No. 10/965,492, filed on Oct. 14, 2004, now abandoned.

(51) Int. Cl.
G06T 1/00 (2006.01)

(52) U.S. Cl. ............. 345/522; 345/418; 345/501; 719/328

(58) Field of Classification Search ............. 345/650
See application file for complete search history.

(56) References Cited

U.S. PATENT DOCUMENTS

| 5,652,749 | A | * | 7/1997 | Davenport et al. | 370/466 |
|---|---|---|---|---|---|
| 5,657,390 | A | * | 8/1997 | Elgamal et al. | 713/151 |
| 5,842,040 | A | * | 11/1998 | Hughes et al. | 710/11 |
| 5,862,383 | A | * | 1/1999 | Laitinen | 717/109 |
| 6,038,232 | A | | 3/2000 | Jung et al. | |
| 6,081,265 | A | | 6/2000 | Nakayama et al. | |
| 6,411,301 | B1 | | 6/2002 | Parikh et al. | |
| 6,421,058 | B2 | | 7/2002 | Parikh et al. | |
| 6,421,738 | B1 | * | 7/2002 | Ratan et al. | 719/328 |
| 6,424,348 | B2 | | 7/2002 | Parikh et al. | |
| 6,434,578 | B1 | | 8/2002 | McCauley et al. | |
| 6,452,600 | B1 | | 9/2002 | Parikh et al. | |
| 6,466,218 | B2 | | 10/2002 | Parikh et al. | |
| 6,538,656 | B1 | | 3/2003 | Cheung et al. | |

(Continued)

FOREIGN PATENT DOCUMENTS

EP  1320240 A2  6/2003

(Continued)

OTHER PUBLICATIONS

X Protocol Reference Manual, 1995, pp. 5-40.*

(Continued)

*Primary Examiner*—Said Broome
(74) *Attorney, Agent, or Firm*—Lee & Hayes, PLLC

(57) ABSTRACT

A portable graphics encoder connects with one or more protocol decoder devices based on a particular communication protocol. The portable graphics encoder is not specific to any particular operating system. The portable graphics encoder receives protocol decoder device commands such as input instructions that determine higher-level graphics commands that are sent to the one or more protocol decoder devices. The higher-level graphics commands are extracted from graphics sources such as application programs. The portable graphics encoder encodes the higher-level graphics commands according to a format defined by the communication protocol, and the encoded higher-level graphics commands are sent to the one or more protocol decoder devices.

19 Claims, 7 Drawing Sheets

U.S. PATENT DOCUMENTS

| | | | |
|---|---|---|---|
| 6,615,382 B1 * | 9/2003 | Kang et al. | 714/748 |
| 6,697,074 B2 | 2/2004 | Parikh et al. | |
| 6,798,418 B1 | 9/2004 | Sartori et al. | |
| 6,867,781 B1 | 3/2005 | Van Hook et al. | |
| 6,957,769 B2 | 10/2005 | Hepworth et al. | |
| 7,002,591 B1 | 2/2006 | Leather et al. | |
| 7,075,538 B2 * | 7/2006 | Peacock | 345/441 |
| 7,191,233 B2 | 3/2007 | Miller | |
| 7,196,710 B1 | 3/2007 | Fouladi et al. | |
| 7,200,809 B1 | 4/2007 | Paul et al. | |
| 7,216,288 B2 * | 5/2007 | Westerink et al. | 715/201 |
| 7,274,368 B1 | 9/2007 | Keslin | |
| 7,434,166 B2 | 10/2008 | Acharya et al. | |
| 2002/0058499 A1 | 5/2002 | Ortiz | |
| 2002/0103935 A1 | 8/2002 | Fishman et al. | |
| 2003/0017846 A1 | 1/2003 | Estevez et al. | |
| 2003/0033560 A1 * | 2/2003 | Dassow et al. | 714/39 |
| 2003/0076328 A1 | 4/2003 | Beda et al. | |
| 2003/0076329 A1 | 4/2003 | Beda et al. | |
| 2003/0222883 A1 | 12/2003 | Deniau et al. | |
| 2004/0081202 A1 * | 4/2004 | Minami et al. | 370/469 |
| 2004/0123109 A1 | 6/2004 | Choi | |
| 2004/0177373 A1 | 9/2004 | Kawabe et al. | |
| 2004/0199574 A1 | 10/2004 | Franco et al. | |
| 2005/0123267 A1 | 6/2005 | Tsumagari et al. | |
| 2005/0132385 A1 | 6/2005 | Bourges-Sevenier | |
| 2005/0163493 A1 | 7/2005 | Kobayashi et al. | |
| 2005/0182791 A1 | 8/2005 | Lim et al. | |
| 2006/0080382 A1 * | 4/2006 | Dutta et al. | 709/203 |

FOREIGN PATENT DOCUMENTS

| | | |
|---|---|---|
| JP | 2005151147 A | 6/2005 |
| WO | WO0122238 A1 | 3/2001 |
| WO | WO2005029369 A2 | 3/2005 |

OTHER PUBLICATIONS

Nye, "X Protocol Reference Manual", O'Reilly & Associates, Inc., 1989, 1990, 1992, 1995, pp. 38.
European Patent Office Search Report dated Dec. 5, 2008, 8 pages.
PCT international Search Report dated Jan. 2, 2007, 4 pages.

* cited by examiner

ENCODING FOR REMOTING GRAPHICS TO DECODER DEVICE

RELATED APPLICATIONS

This is a continuation of and claims priority to U.S. patent application Ser. No. 10/965,492 filed on Oct. 14, 2004 entitled "Encoding For Remoting Graphics to Decoder Device" by inventors Wilheim Schmieder, Ido Ben-Shachar, Joy Chik, and John Parsons.

TECHNICAL FIELD

This invention relates to providing graphics commands to protocol decoder devices such as client computers.

BACKGROUND

A server computer may host application programs and/or connect to a graphics source. Graphics commands representing graphics, from the application programs and/or the graphics source are remotely accessed by client computers. A terminal service platform, such as Windows® Server 2003 operating system provided by the Microsoft Corporation, is one implementation of such technology, where graphics commands are sent to client computers.

The server computer is referred to as a host computer or terminal server. The client computer is referred to as a remote terminal or remote client, and communicates with the server computer through a communications medium such as a network. In order to communicate or exchange information (e.g., graphics commands), the server computer and client computers may implement a communication protocol such as remote desktop protocol (RDP) as defined by the Microsoft Corporation.

In many operating systems, such as the Windows® Server 2003 operating system, application programs send relatively higher-level graphics commands or primitives to operating system components of the server computer. Such higher-level graphics commands might specify or define colors, lines, shapes, and other graphics constructs. The operating system components interpret or convert such higher-level graphics commands into relatively lower-level graphics commands or information such as individual pixel values or bitmaps. Such a process of converting from higher-level graphics commands to relatively lower-level graphics commands will be referred to herein as rendering.

Application programs utilize operating system components of the server computer in rendering the relatively lower-level graphics commands from higher-level graphics commands. The operating system components are configured to provide the rendered relatively lower-level graphics commands to a remote client, which utilizes this information to control its display device.

Application programs and graphics sources are typically designed to operate in conjunction with a local display device or monitor of the server computer. Higher-level graphics commands from application programs or graphics sources are passed to a display driver component of the operating system. The display driver controls a local display adapter device/card which generates graphics on the local display device. When rendering the higher-level graphics commands to relatively lower-level graphics commands, operating system components may use another display driver that "mirrors" the drawing operations of the local display adapter device/card. Such a driver is called a mirror driver. In effect, the mirror driver acts as a display driver except it does not generate graphics to a display. Instead, it transmits the higher-level graphics commands to the client-computer, which then does the actual generating of graphics. The mirror driver, or other remote display driver, may format the lower-level graphics commands into communication protocol (e.g., RDP) specific units that are sent to the client computers.

The operating system components, including the display driver and mirror driver (i.e., remote display driver), are typically integrated as part of a "kernel" or central module of the operating system. The kernel is particular to the operating system of the server computer and is not easily replaceable. Regardless, client computers or other devices that are able to decode protocol specific units rely on the server computer, and in particular operating system specific components of the server computer to communicate and receive the protocol specific units. In specific, sending and receiving graphics commands relies on traditional terminal service server and client implementations which depend on operating system kernel components.

SUMMARY

A protocol encoder device sends higher-level graphics commands from graphics sources to a protocol decoder device. The higher-level graphics commands are encoded into a format specific to a communication protocol used to connect the protocol encoder device with the protocol decoder device.

BRIEF DESCRIPTION OF THE CONTENTS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

The following disclosure describes sending higher-level graphics commands from protocol encoder devices to protocol decoder devices. A protocol encoder device processes the higher-level graphics commands from various sources, such as application programs, video sources, and other computers.

Client-Server Computer System

Figure 1:
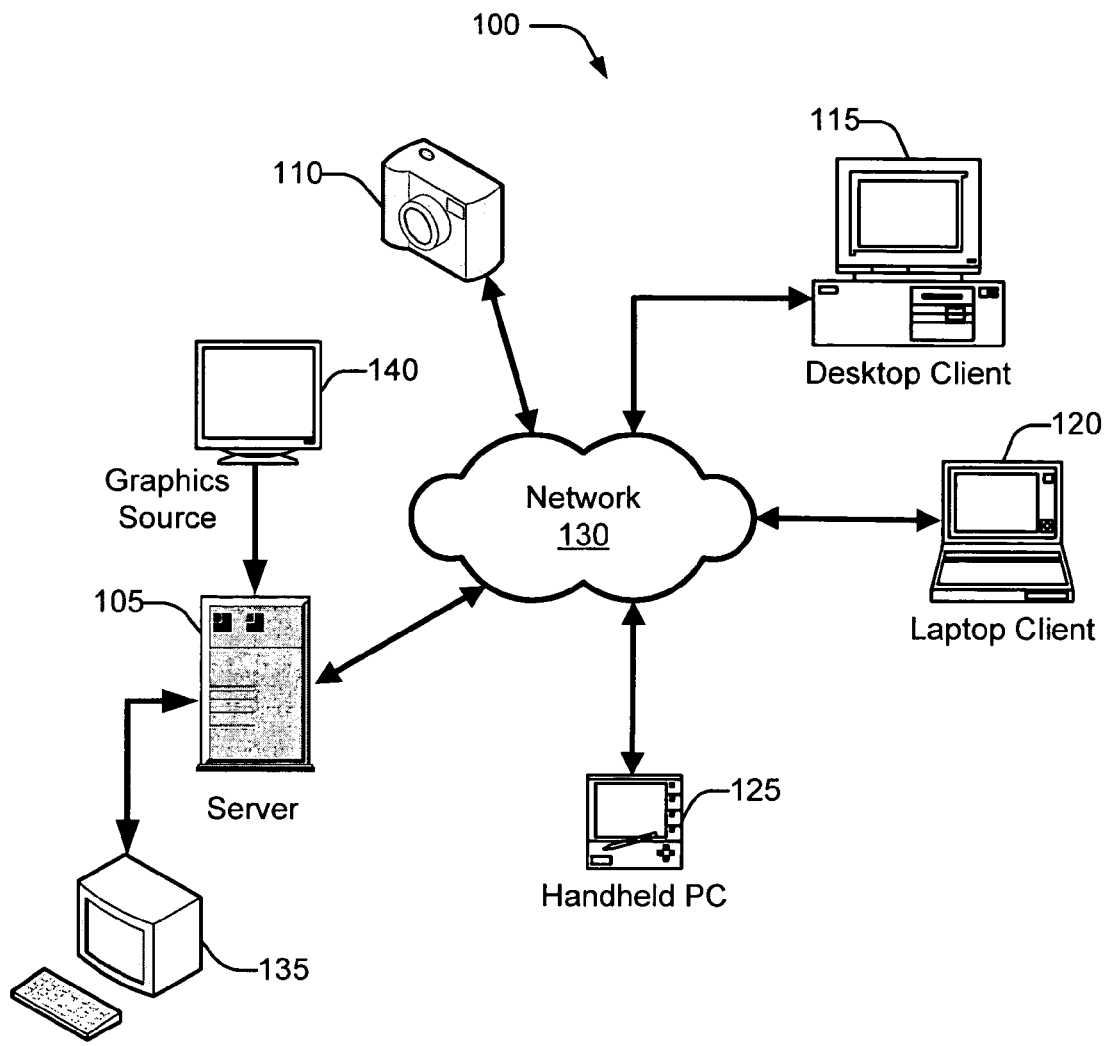
FIG. 1 is an illustration of a protocol encoder device—protocol decoder device system where multiple protocol decoder devices receive higher-level graphics commands from one or more protocol encoder devices.

FIG. 1 shows a protocol encoder device—protocol decoder devices system 100. The system 100 includes one or more protocol encoder devices. Examples of protocol encoder devices include a server computer 105. Furthermore, a digital camera 110 may present a user interface (UI) to a user that might include menus, buttons, and picture-thumbnails. It would achieve this by injecting the graphics for these UI elements as a graphics-source. Other examples of protocol encoder devices include handheld PCs (not shown) which would allow collaborative applications where screen sharing is performed at the handheld PC.

Server computer 105 and digital camera 110 communicate with one or more protocol decoder devices. In this example, the protocol decoder devices include a desktop computer 115, a laptop computer 120, and a handheld PC 125. Communication between protocol encoder devices and protocol decoder devices is performed using a communication protocol such as remote desktop protocol (RDP) as defined by the Microsoft Corporation.

Desktop computer 115 is a general-purpose PC implemented with a Windows® brand operating system from the Microsoft Corporation, a Linux® brand operating system, or other operating system. The desktop computer 115 is a standalone computer that primarily interfaces to server computer 105 to access files or other information (e.g., application programs hosted on server computer 105) that are not locally stored.

Laptop computer 120 is configured with its own operating system, processing unit, and storage system. The laptop computer 120 may likewise be configured to run a Windows® brand operating system, a Linux® operating system, or other operating system.

Handheld PC 125 may possess less functionality than a general-purpose computer. Handheld PC 125 may be equipped with one of various operating systems including a Windows® brand operating system, such as Windows® CE operating system from the Microsoft Corporation.

A network 130 connects the protocol encoder devices with the protocol decoder devices. Furthermore, the network 130 connection between the devices may implement a transport protocol such as transmission control protocol over Internet protocol (TCP/IP). In other implementations a direct stream oriented connection may be established between protocol encoder devices and protocol decoder devices.

Protocol encoder devices such as the server computer 105 and/or digital camera 110 send higher-level graphics commands which are encoded per the communication protocol to protocol decoder devices (i.e., computers 115, 120, and 125). The higher-level graphics commands allow the generating of graphics at the protocol decoder devices. As further discussed below, protocol encoder devices such as the server computer 105 receive higher-level graphics commands from graphics sources that may include application programs, or from various graphics sources such as other computers, and encode the higher-level graphics commands per the defined communication protocol.

The computers 115, 120, and 125 may be based on different operating systems; however, the computers 115, 120, and 125 are able to receive and generate graphics from the higher-level graphics commands received from the protocol encoder devices (e.g., server computer 105 and/or digital camera 110).

The system 100 is representative of many different architectures including direct dialup via modem, enterprise LANs (local area networks), WANs (wide area networks) and the Internet. The network 130 may be implemented in a number of ways to support such networking contexts, including both wired-based technologies and wireless technologies. Aspects of this invention are not limited to one specific network architecture or network technology.

The server computer 105 may be implemented as a Windows® Server 2003, Windows® NT server, Linux®, or any other operating system. A more detailed description of the server computer 105 is given below with respect to FIG. 7. The communication protocol (e.g., RDP) used by protocol encoder devices and protocol decoder devices may provide for encoded protocol data units (PDU) defined as having a particular data format. The encoded PDUs are particularly used to provide information to and from the protocol encoder devices and the protocol decoder devices. For example, higher-level graphics commands from the server computer 105 are provided as encoded PDUs, and requests from computers 115, 120, and 125 are provided as encoded PDUs.

A display device 135, which includes a display and input devices such as a keyboard and mouse, connects locally to server computer 105. Display device 135 provides user input to application programs hosted by server computer 105 and displays generated graphics from server computer 105.

A graphics source 140 which includes remote computers (i.e., sources displaying graphics) may provide higher-level graphics commands to the server computer 105. It is contemplated that graphics source 140 may be implemented as hardware, software, firmware or a combination. Graphics source 140 may be any source that generates a list of graphics orders. Graphics source 140 may be connected to server computer 105 through one of various physical connections as discussed below. Furthermore, graphics source 140 may be connected though one or more networks to server computer 105. In certain implementations, graphics source 140 is part of server computer. In specific, when application programs are resident on server computer 105, graphics source 140 may be implemented as part of server computer 105.

Device Architectures

Figure 2:
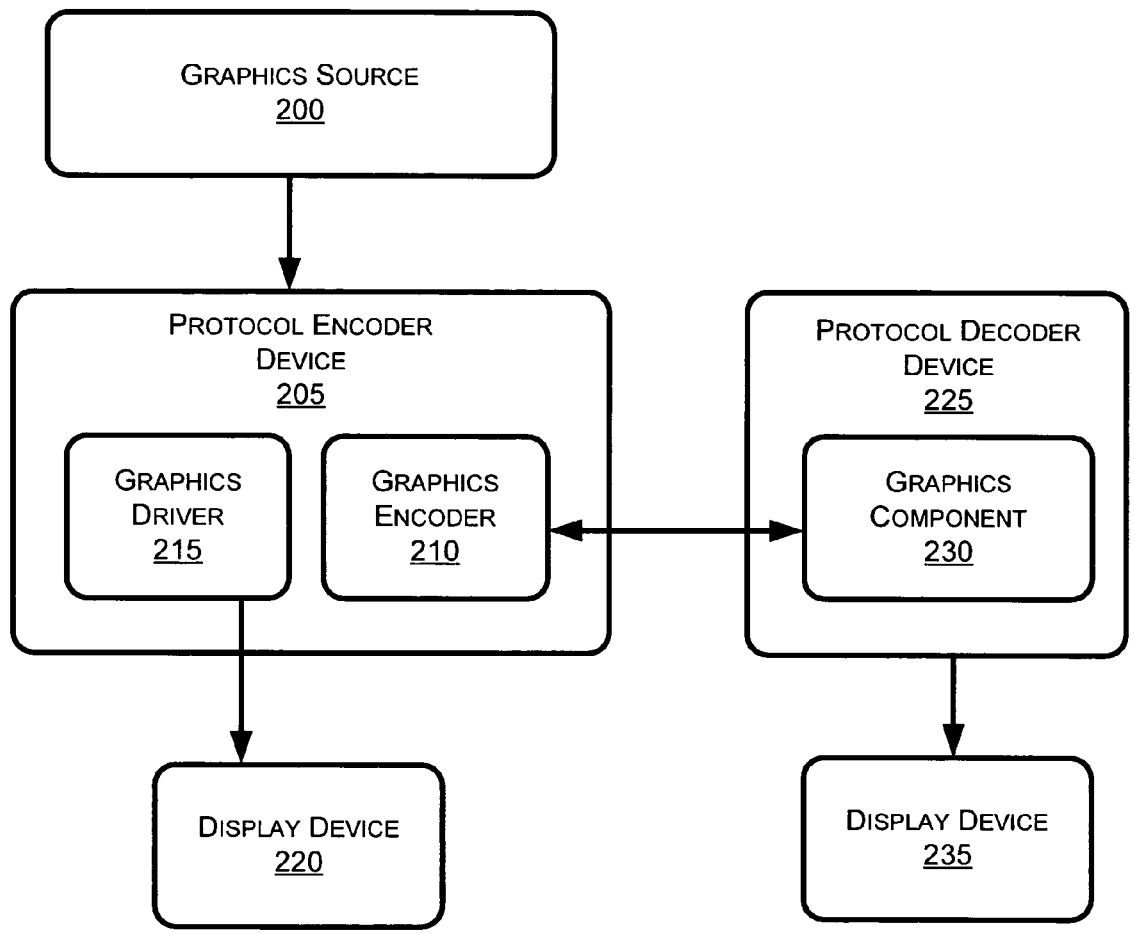
FIG. 2 is a block diagram of protocol encoder device and protocol decoder device components.

FIG. 2 shows example top level architectures at a protocol encoder device and a protocol decoder device. A graphics source 200 such as graphics source 140 is connected to a protocol encoder device 205 (e.g., server computer 105). Protocol encoder device 205 may be implemented as hardware, software, firmware or a combination. For example, it is contemplated that for certain implementations, protocol encoder 205 is a software program included in a hardware device. In particular implementations, the graphics source 200 is part of protocol encoder device 205, such as when application programs are resident on server computer 105 or when digital camera 110 includes the graphics source 200. Graphics source 200 in particular provides for graphics protocol data units (PDUs) as defined by the communication protocol. Such PDUs are not encoded and are received by the protocol encoder device 205 and encoded per the communication protocol by a graphics encoder 210.

Application programs resident on server computer 105 and graphics sources connected (e.g., graphics source 140) to server computer 105 specify graphics in terms of relatively higher-level graphics commands such as RDP commands, and particularly formatted PDUs.

When graphics are generated locally at the protocol encoder device 205, higher-level graphics commands are processed or extracted from graphics source 200 by a local graphics driver 215. Since graphics source 200 provides formatted PDUs, the formatted PDUs are decoded prior to local graphics generating. Local graphics driver 215 uses the higher-level graphics commands to generate graphics which are displayed on display device 220. Furthermore, local graphics driver 215 is specific to the operating system implemented by protocol encoder device 205 and may or may not reside in the kernel. It is contemplated that local graphics driver 215 may be replaceable. Local graphics driver 215 is particularly used in screen sharing implementations where higher-level graphics commands are sent to protocol decoder device 215.

In certain cases, higher-level graphics commands from graphics source 200 are received by graphics encoder 210. In particular protocol specific PDUs are provided by graphics source 200 and received by graphics encoder 210 for encoding in a protocol specific format and sent to protocol decoder device 225. Graphics encoder 225 is configured to be a portable component part of the operating system kernel of protocol encoder device 205. Graphics encoder 210 may be loaded or created by the protocol encoder device 205 when communication is performed with protocol decoder device 225. Graphics encoder 210 is further described in different in implementations FIGS. 4 and 5. In general, higher-level graphics commands from graphics source 200 in the form of PDUs are received by graphics encoder 210 which encodes the higher-level graphics commands into a format defined by the communication protocol used by protocol encoder device 205 and protocol decoder device 225.

The encoded (i.e., formatted) higher-level graphics commands are received by protocol decoder device 225. Protocol decoder device 225 includes a graphics component 230, which may further include a graphics driver component and a graphics generator component. In particular, graphics component 230 decodes the formatted higher-level graphics commands and generates graphics from decoded higher-level graphics commands. The generated graphics are displayed on a local display device 235.

Graphics Sources

Figure 3:
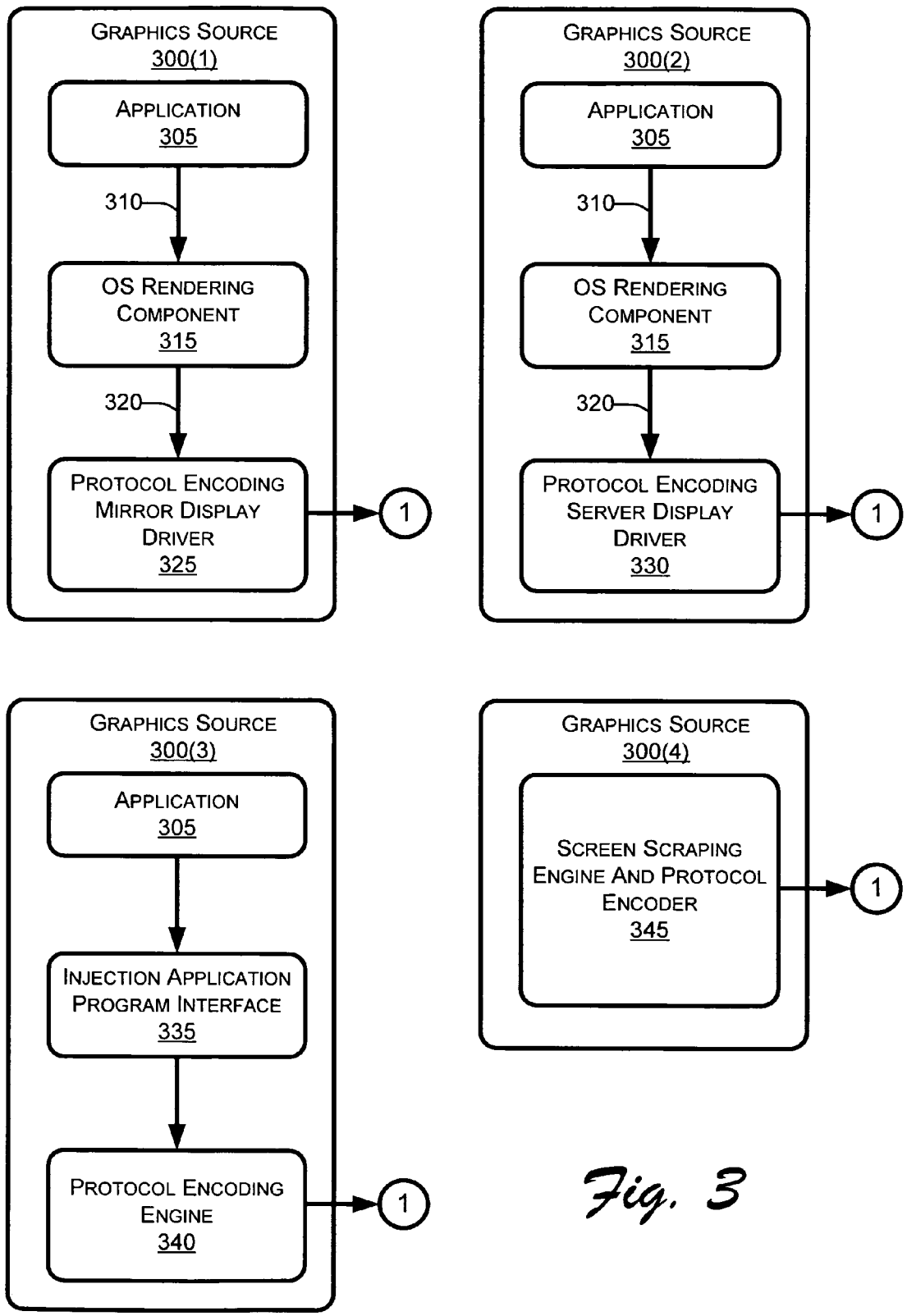
FIG. 3 is a block diagram of various graphics sources that provide protocol data units to a graphics encoder included in a protocol encoder device.

FIG. 3 shows examples of graphics source architectures. Graphics sources 300 may describe graphics sources 140 and 200. In one implementation, a graphics source 300(1) includes an application program 305 from which higher-level graphics commands are extracted. The higher-level graphics commands may be extracted through application program interface calls call such as "Win32 API" calls defined by Windows® Terminal Services platform.

Application program 305 calls an operating system (OS) rendering component 315, which may be a graphics display interface (GDI) component as defined by Windows® Terminal Services platform. OS rendering component 315 may be used to generate graphics locally.

The OS rendering component 315 in turn calls a protocol encoding mirror display driver 325 which produces graphics PDUs representative of the higher-level graphics commands. As described below, the graphics PDUs are sent to, encoded by, and sent by a graphics encoder to a protocol decoder device.

In another implementation, a graphics source 300(2) includes a protocol encoding server display driver 330 which replaces and performs the encoding functions of the protocol encoding mirror display driver 325. In this implementation, the protocol encoding server display driver 330 is a local display driver used in generating graphics at the protocol encoder device.

Another implementation is graphics source 300(3) where an injection application program interface 335 receives the higher-level graphics commands from application program 305. The injection application program interface 335 sends the higher-level graphics commands to protocol encoding engine 340 which produces graphics PDUs representative of the higher-level graphics commands.

Injection application program interface 335 is configured to process or extract higher-level graphics commands from application program 305 or a graphics source, where a graphics source may be any source displaying graphics (e.g., video) from which graphics commands or higher-level graphics commands are extracted.

Exemplary uses of graphics injection using injection application program interface 335 include accessing graphics from a graphics source or displaying information such as stock reports, news, etc. In these implementations, the graphics source may be separate from protocol encoder device (e.g., server computer). A graphics-source may be generated within an application. For instance, an application may state that it wants the protocol encoding engine 340 to encode a red square in the middle of a black screen for display at a decoder device. This could be useful in systems that do not use a prior art complex graphics-system and provide an ability to generate a simple set of drawings for display. The Graphic injection application performs provides this ability by sending a PDU to a protocol state machine. In this example, the PDU will be of the type "TS_UPDATETYPE_ORDERS" and contains two protocol graphic orders of type "TS_ENC_OPAQUE-RECT_ORDER" where the first opaque rectangle order will be painted on the entire surface and the second opaque order will paint the red square.

Furthermore, the graphics source need not be based on the operating system(s) or hardware platform(s) implemented by the protocol encoder device or protocol decoder device as long as higher-level graphics commands can be extracted using injection application program interface 335. This allows for the ability of protocol encoder devices and protocol decoder devices to access graphics (i.e., higher-level graphics commands) from other devices running different operating systems.

In another exemplary implementation, a graphics source 300(4) implements a screen scraping engine and protocol encoder 345. Screen scraping engine and protocol encoder 345 acts as a mirror driver and encodes higher-level graphics commands sent to protocol decoder devices. The mirroring applies to a local graphics driver of protocol encoder device. The local graphics driver generates graphics displayed locally. The higher-level graphics commands used in generating graphics locally are mirrored by the screen scraping engine and protocol encoder 345. The mirrored higher-level graphics commands are then encoded as graphics PDUs by screen scraping engine and protocol encoder 345.

For implementations of the graphics source 300, the graphics PDUs that are sent may include a string of graphics PDUs. In certain cases, the final PDU of the string of PDUs may be modified to indicate a "last" or final PDU of the string of PDUs.

Graphics Encoder

Figure 4:
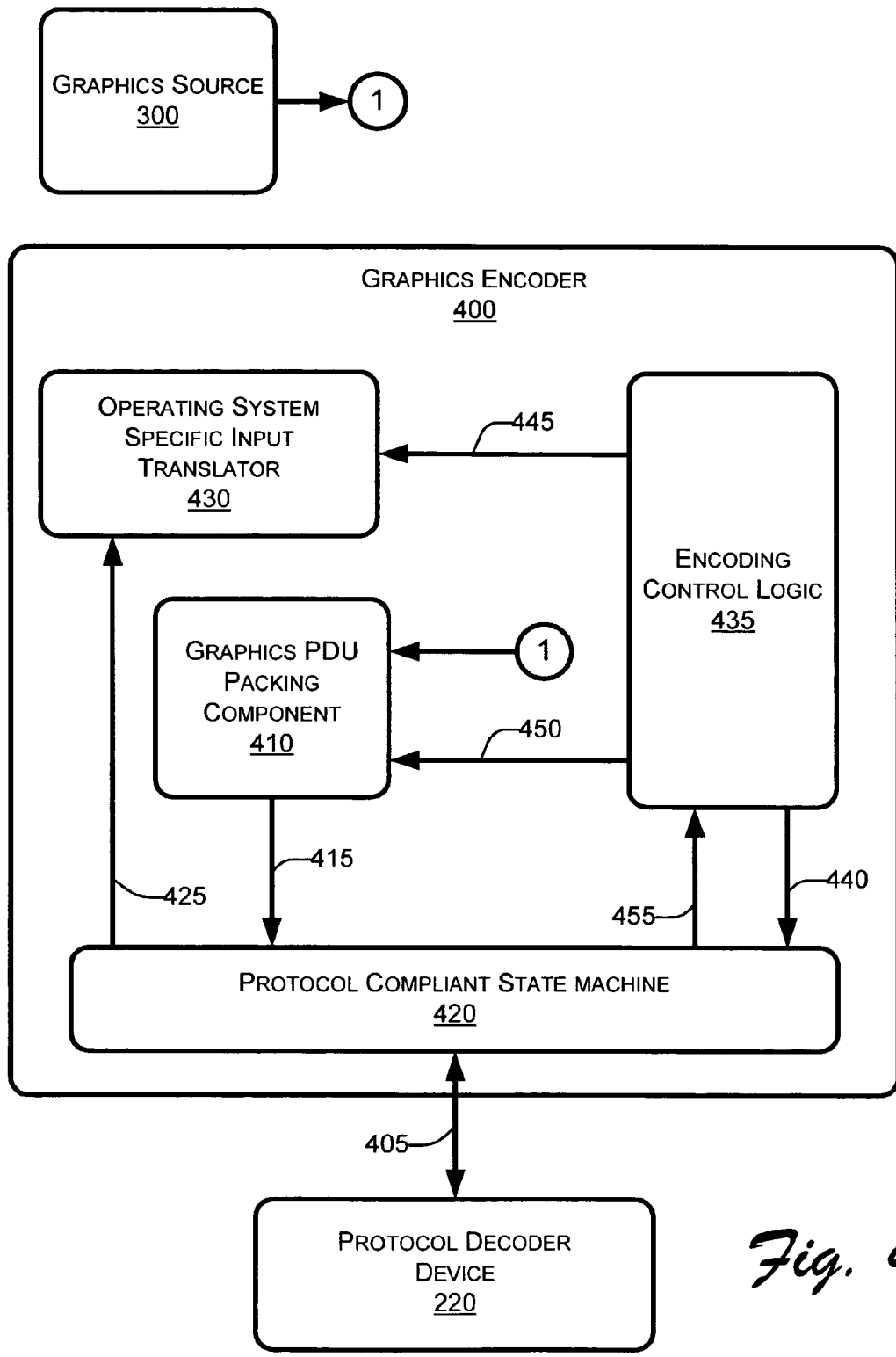
FIG. 4 is a block diagram of a graphics encoder included in a protocol encoder device, that encodes and passes graphics PDUs and communicates with a protocol decoder device.

FIG. 4 shows an example graphics encoder that receives and encodes graphics PDUs, and communicates with a protocol decoder device. FIG. 4 is an exemplary implementation and it is noted that the described components may be implemented using different architectures. For example, the described components may be implemented as computer program routines or as executable functions such as DLLs (dynamic library links).

Graphics PDUs from graphics source 300 are received by a graphics encoder 400. Graphics encoder 400 is included in a protocol encoder device (e.g., protocol encoder device 205), and as described above is configured to be portable between different operating systems. In other words, different operating systems may use graphics encoder 400.

A stream-oriented connection 405 may be used to connect graphics encoder 400 with protocol decoder device 220. As described above a network connection may also be implemented. In this example, stream-oriented connection 405 includes encoded graphics PDUs sent from graphics encoder 400 and encoded PDUs sent from protocol decoder device 220. The stream-oriented connection 405 includes PDUs that represent higher-level graphics commands from graphics encoder 400 and information such as input commands from the protocol decoder device 220 to graphics encoder 400. In certain implementations, stream-oriented connection 405 may be implemented using various network or transmission protocols such as transmission control protocol over internet protocol (TCP/IP); named pipe stream protocols; or shared memory protocols. PDUs sent through stream-oriented connection 405 are received in the order that they are sent.

Graphics PDUs are received by a graphics PDU packing component 410 which packages the graphics PDUs into lower level protocol units 415 that are received by a protocol compliant state machine 420. Lower level protocol units 415 are defined and formatted per the particular communication protocol (e.g., RDP) that is implemented.

Protocol compliant state machine 420 specifically communicates with protocol decoder device 220 using the implemented communication protocol. Protocol compliant state machine 420 may be implemented in software, hardware, firmware, or a combination. Although based on a particular communication protocol, protocol compliant state machine 420 is not restricted to current and specific implementation of the communication protocol and may be updated to support changes in the communication protocol. Protocol compliant state machine 420 may be installed or loaded when a graphics source (e.g., graphics source 300) attempts to send higher-level graphics commands (i.e., graphics PDUs) to graphics encoder 400.

Protocol compliant state machine 420 negotiates with protocol decoder device 420 as to compression, encryption, and graphics encoding parameters based on a specification of the communication protocol (e.g., RDP specification). When an input command in the form of an encoded PDU is received from the protocol decoder device 420, protocol compliant state machine 420 decodes the PDU and forwards it as input PDU 425 to an operating system specific input translator 430.

Operating system specific input translator 430 is specific to the operating system of the protocol encoder device, and is replaceable (i.e., if encoder 400 is ported over to another operating system, operating system specific input translator 430 may be replaced). Protocol decoder device 220 may send input information such as keystrokes or mouse movement. The input information is described using the particular communication protocol. Operating system specific input translator 430 translates the communication protocol formatted input information sent by the protocol decoder device 220 into actions or data structures specific to the operating system of the protocol encoder device.

Encoding control logic 435 provides control and defined functionality for the components of graphics encoder 400. In particular, encoding control logic 435 provides control interfaces 440, 445, 450 respectively to protocol compliant state machine 420, operating system specific input translator 430, and graphics PDU packing component 410. An example of control is when graphics source 300 sends graphics PDUs to graphics PDU packing component 410. The formatted graphics PDUs cannot be sent from graphics PDU packing component 410 to protocol compliant state machine 420, until the protocol decoder device 220 is authorized. Since the protocol compliant state machine 420 performs negotiating with the protocol decoder device 220, communication protocol events 455 are passed to the encoding control logic 435 indicating authorization of protocol decoder device 110. Other functions that may be provided by encoding control logic 435 include authenticating and managing connections with protocol decoder device 220, and setting up and getting parameters for such connections.

Intermediate Language

For certain implementations, an intermediate language is used to convey higher-level graphics commands. Communication protocols such as the RDP communication protocol may include complicated protocol orders such as state synchronization commands between protocol encoder devices and protocol decoder devices. Furthermore, if graphics source 300(3) which includes injection application program interface 335 is used, graphics source 300(3) may need to have an intimate knowledge of the communication protocol in order to provide valid higher-level graphics commands as defined by the communication protocol.

Therefore the intermediate language may be implemented at graphics source 300. The intermediate language may include simplified syntax or syntax more applicable to the graphics source 300. Such syntax may be different than the syntax of the language defined by the particular communication protocol. In this implementation, an intermediate language encoder may be included in graphics encoder 410. The intermediate language encoder the received intermediate language graphics commands into graphics PDUs as defined by the communication protocol.

An example of drawing commands in an intermediate language is the following which describes red square in the middle of a black screen:

var oFrame=Encoder.CreateFrame( );
    Frame.DrawRec(0, 0, ScreenSize.x, ScreenSize.y, BLACK);
    Frame.DrawRect(64, 64, ScreenSize.x-64, ScreenSize.y-64, RED);
    Frame.Flush( );

Application Program Sharing

Figure 5:
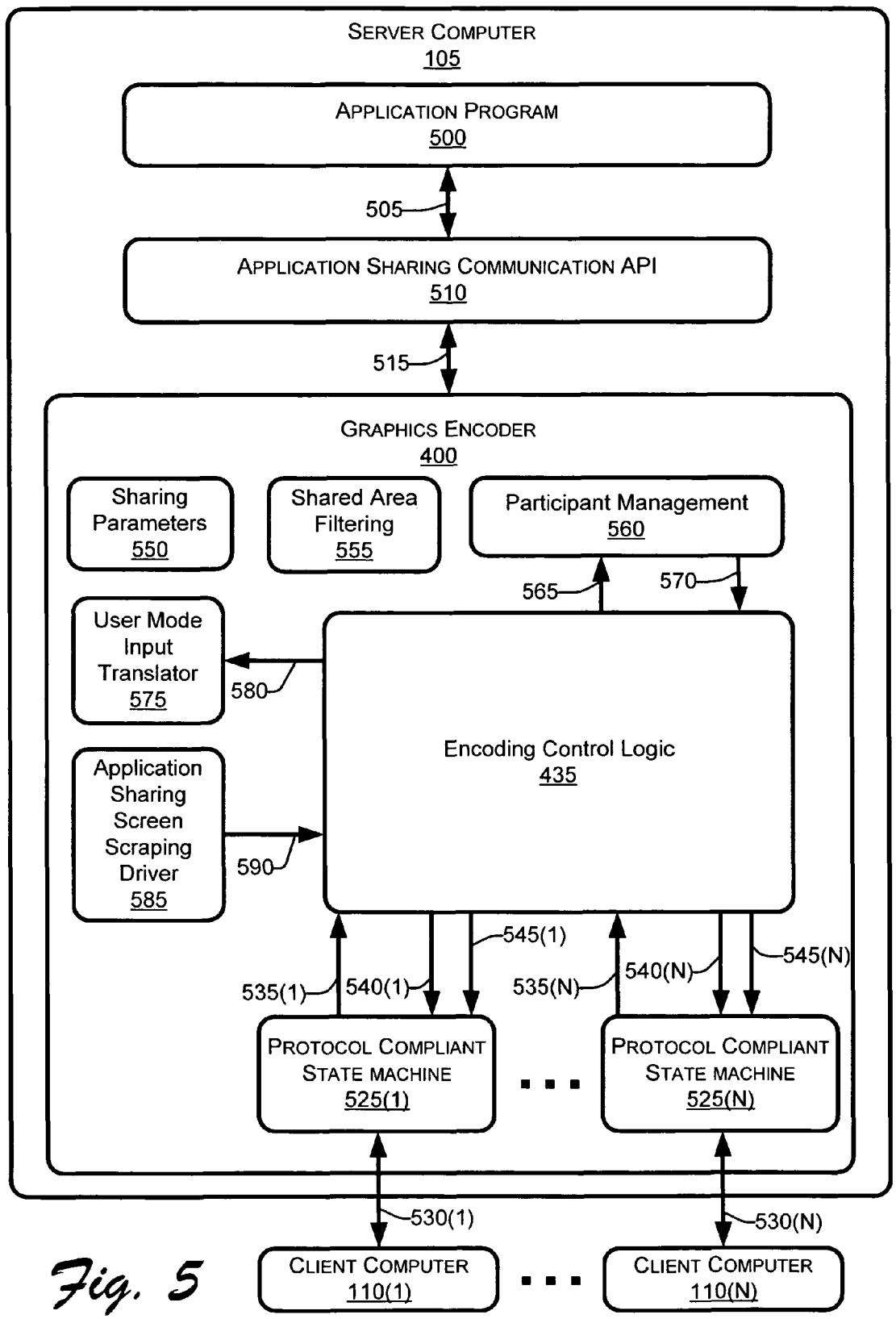
FIG. 5 is a block diagram of a graphics encoder included in a protocol encoder device, that supports multiple protocol decoder devices which access an application program through an application program interface.

FIG. 5 shows a graphics encoder 215 that supports multiple client computers 110 (i.e., protocol decoder devices) accessing an application program 500. The application program 500 sends higher-level graphics commands and receives client computer 110 commands and instructions through a connection 505. In this example, server computer 105 includes graphics encoder 400 which connects with client computers 110.

An application sharing communication application program interface (API) 510 connects with application program 500. In this implementation, API 510 connects with graphics encoder 215 via a connection 515 which may be a programmatic interface such as a C++ language interface. In other implementations, API 510 is integrated as part of graphics encoder 215.

API 510 passes input commands to application program 500 from authorized client computers 110. API 510 sends to authorized client computers 110 higher-level graphics commands from application program 500, such that authorized client computers 110 view the same graphics (i.e., generate the same graphics using the same higher-level graphics commands). This use is particularly of benefit in multi-party conference situations.

Graphics encoder 400 includes dedicated protocol compliant state machines 525(1)-525(N) which respectively support client computers 110(1)-110(N). Protocol compliant state machines 525 perform similar functions as protocol compliant state machine 310 describe above, such as negotiating with client computers 110 as to compression, encryption, and graphics encoding as defined by a particular communication protocol. Dedicated protocol compliant state machines 525 allow for each client computer 110 to have a different negotiated set of properties, for example the property of color-depth. Thus, a client computer 110 that only supports low-color-depth can get a degraded experience while another client computer 110 better can get the full color-richness experience.

Furthermore, if one of the client computers 110 has a relatively slow link between itself and the server computer 105, it is advantageous to not have the slower client computer 110 affect (i.e., "bottleneck") transmission to the other client computers 110. For instance, if video is being shown, and one client computer 110 can only receive one frame per-second, the other client computers 110 which are capable to receive are a greater rate of frames are not limited by the "slower" client computer 110.

Stream-oriented connections 530(1)-530(N) connect client computers 110 with graphics encoder 400 by way of protocol compliant state machines 525. The stream-oriented connections 530 are similar to stream-oriented connection 305 described above, and include information in the form of formatted PDUs.

Each of the protocol compliant state machines 525 provides input commands from client computers 110 as formatted communication protocol events 535 to encoding control logic 435. Encoding control logic 435 provides a control interface 540 and sends graphics PDUs 545 to each of protocol compliant state machines 525.

Certain client computers 110 have particular access rights to (i.e., usage) application program 500. In other words, certain client computers 110 may have complete access rights to application program 500, while other client computers 110 may have limited access rights to application program 500. Using the example of a multi-party conference situation, certain client computers 110 may be moderators and are able to view graphics from and provide input to application program 500, while other client computers 110 may be viewers that are only able to view graphics (i.e., receive higher-level graphics commands) from application program 500.

Sharing parameters component 550 defines access rights of each of client computers 110, such as sharing of a color depth. Shared area filtering component 555 is used to send client computers 110 a portion of a shared screen (i.e., particular higher-level graphics commands related to a portion of a screen display). Through the API 510 the shared area filtering component 555 provides the particular higher-level graphics commands.

A participant management component 560 manages connection of client computers 110, and can also instruct the API 510 as to which client computers 110 are connected and disconnecting client computers 110. Connection events 565 are received from encoding control logic 435, which include requests sent from client computers 110 to connect with graphics encoder 215 (i.e., server computer 105). Participant management component 560 sends connection control commands 570 to encoding control logic 435, which are passed on to client computers 110 to allow and maintain connection with graphics encoder 400 (i.e., server computer 105).

A user mode input translator 575 receives input PDUs 580 which includes input from client computers 110. Input translator 575 performs functions similar to operating system specific input translator 430. In particular, input translator 575 translates the input PDUs 580 sent by the client computer 110 into actions or data structures as defined and understood by the operating system of server computer 105.

An application sharing screen scraping driver 585 performs similar functions as screen scraping engine and protocol encoder 345 described in FIG. 3. In particular, application sharing screen scraping driver 585 is used to extract or mirror higher-level graphics commands from a local graphics driver and encodes the extracted higher-level graphics commands as graphics PDUs 590. The graphics PDUs 590 are sent to encoding control logic 435 which passes them on to protocol compliant state machines 525 in the form of graphics PDUs 545.

Figure 6:
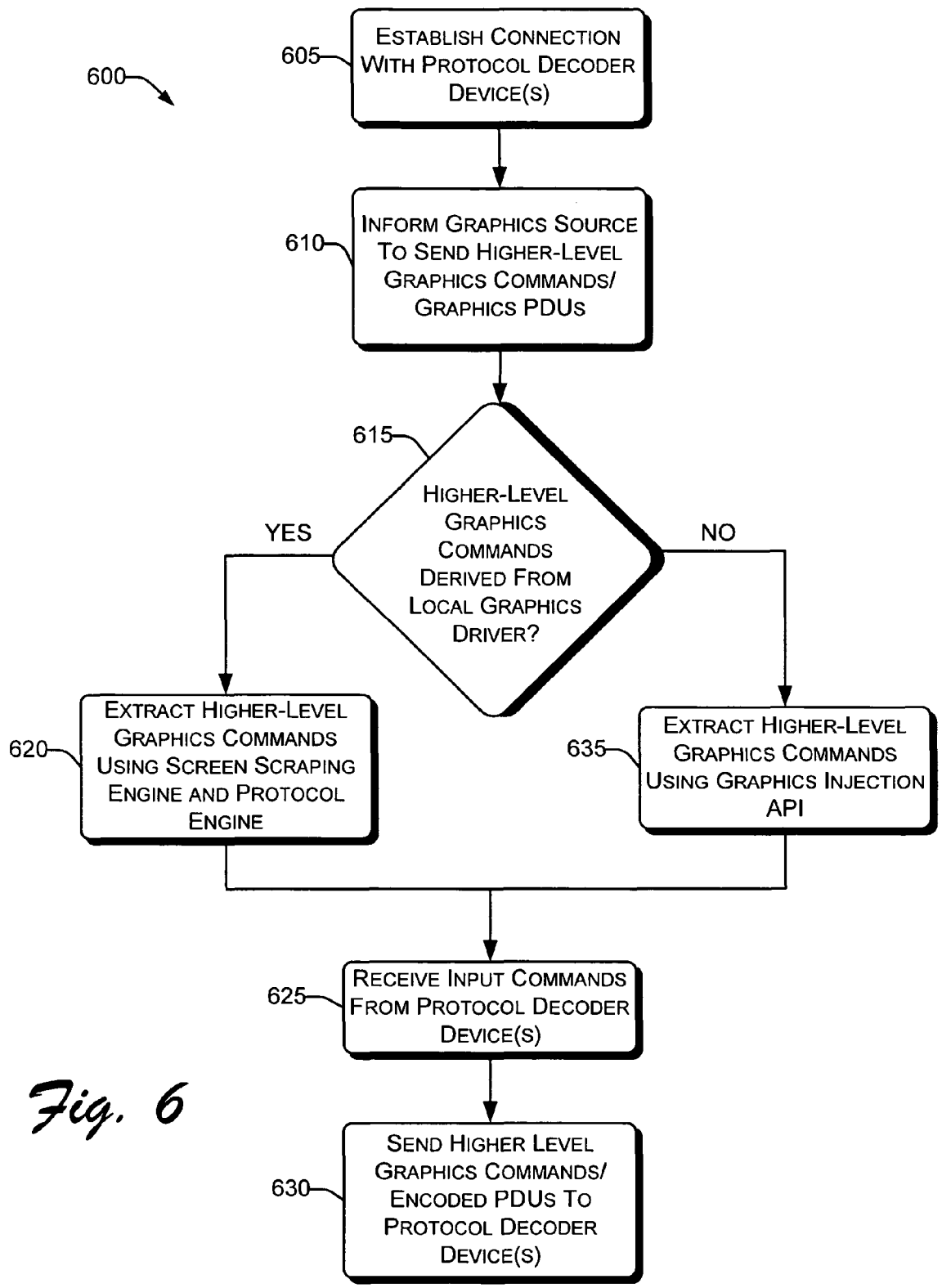
FIG. 6 is a flow diagram illustrating establishing connections between a graphics encoder and one or more protocol decoder devices and providing encoded graphics PDUs to the protocol decoder devices.

FIG. 6 shows a process 600 to establish connections between a protocol encoder device and one or more protocol decoder devices, and provide higher-level graphics commands to the protocol decoder devices.

The process 600 is illustrated as a collection of blocks in a logical flow graph, which represent a sequence of operations that can be implemented in hardware, software, firmware, or a combination thereof. In the context of software, the blocks represent computer instructions that, when executed by one or more processors, perform the recited operations. The process 600 is described with reference to protocol encoder device such as server computer 105 of FIG. 1, and particularly to operating system portable graphics encoder 400 of FIG. 4, where server computer 105 and graphics encoder 400 provides for means to perform particular processes.

Although described as a flowchart, it is contemplated that processes may take place concurrently. For example, sending encoded graphics PDUs and the processing of graphics PDUs may be two concurrent actions which may take place in a loop until a protocol decoder device is disconnected or the protocol encoder device decides to stop sending graphics PDUs and/or stop processing input.

At block 605, a protocol encoder device through a graphics encoder establishes a connection with one or more protocol decoder devices. A graphics encoder of the protocol encoder device may establish connection with the protocol decoder devices through protocol compliant state machines dedicated to each protocol decoder device. Establishing a connection may be initiated when an application program or graphics source attempts to send higher-level graphics commands or graphics protocol data units (PDU) to protocol decoder device. In other cases, a connection may be initiated from a protocol decoder device requesting to connect to the protocol encoder device. The connection is performed using a particular communication protocol such as RDP communication protocol, where information exchanged between the server computer (i.e., the protocol compliant state machine) and the protocol decoder device(s) may be in the form of encoded and formatted PDUs. The exchanged information may be through a stream-oriented connection which may or may not incorporate a network.

When establishing connection with one or more protocol decoder devices, the dedicated protocol compliant state machine(s) may be loaded (i.e., installed) in the graphics encoder to establish communication with the respective protocol decoder devices. The protocol compliant state machine(s) may be loaded when an application program or graphics source attempts to send higher-level graphics commands (graphics PDUs) to the protocol decoder device(s).

At block 610, the application program or graphics source is directed or informed to begin sending higher-level graphics commands (graphics PDUs) to the graphics encoder. An application program interface (API) may be used to provide information to and access the higher-level graphics commands from the application program or graphics source.

For certain implementations, higher-level graphics commands from the application program or graphics source are used to generate and display graphics to a local display device. The higher-level graphics commands are particularly used by a local graphics driver to generate graphics displayed on the local display device. Higher-level graphics commands are derived from the local graphics driver (i.e., following the "YES" branch of block 615). This implementation applies as to screen sharing situations.

At block 620, a screen scraping engine and protocol encoder extracts or mirrors the higher-level graphics commands that are used to generate graphics at the local graphics driver. The screen scraping engine and protocol encoder encodes the higher-level graphics commands into a format as defined by the communication protocol. In certain cases, when the application program or graphics source implement an intermediate language that has different syntax than the language defined by the communication protocol, an intermediate language encoder may be implemented to translate intermediate language higher-level graphics commands to the language or format as defined by communication protocol. During the establishing connection, access privileges of protocol decoder devices may be determined. Access privileges include the ability of protocol decoder devices to provide inputs and view graphics (i.e., receive higher-level graphics commands related to certain graphics).

At block 625, input commands from the protocol decoder devices may be received. Input commands may represent an action or instruction to be performed on an application program from which higher-level graphics commands are received. Certain protocol decoder devices may be authorized to provide inputs (e.g., commands) to application programs. In certain cases, no inputs are received from the protocol decoder devices; for example, when higher-level graphics commands are sent from a graphics source such as a video display source. An operating system specific input translator receives input commands in the form of communication based protocol information and translates such commands into operating system specific actions or data structures that support the operating system of the protocol encoder device.

At block 630, higher-level graphics commands are sent to protocol decoder devices. The higher-level graphics commands are formatted to support the particular communication protocol and may be sent through the stream-oriented connection by protocol compliant state machine(s) supporting each of the protocol decoder devices. In specific, the higher-level graphics commands are sent as encoded formatted PDUs. The encoded formatted PDUs are decoded at the protocol decoder devices into higher-level graphics commands used to generate graphics.

A graphics injection implementation may take place when higher-level graphics commands are not derived or received from a graphics driver (i.e., following the "NO" branch of block 615). Graphics injection involves receiving higher-level graphics commands through a graphics injection application program interface (API).

At block 635, higher-level graphics commands are injected (i.e., received) from the graphics injection API connected to the application program to a protocol encoding engine which provides the graphics encoder with graphics PDUs or graphics source into a graphics injection application.

Server Computer

Figure 7:
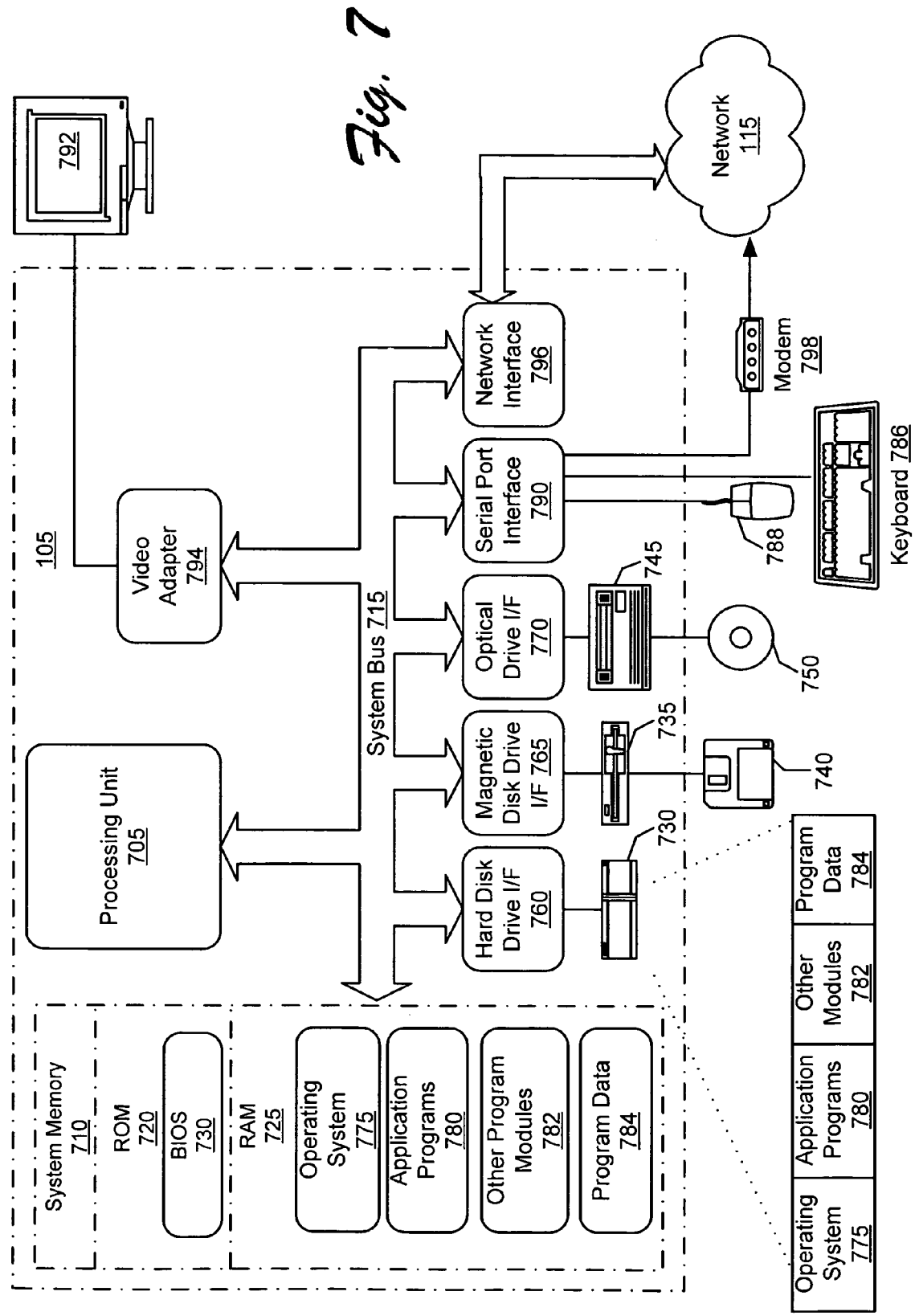
FIG. 7 is a block diagram of an implementation of a protocol encoder device that processes higher-level graphics commands from graphics sources; and encodes and sends the higher-level graphics commands to protocol decoder devices.

FIG. 7 shows an example implementation of a protocol encoder device, and in particular server computer 105. Other protocol encoder devices may implement different architectures; however, it is contemplated that the protocol encoder devices are able to support or port over the described graphics encoder 400 regardless of the operating system that is implemented by the protocol encoder devices. As appreciated by those skilled in the art, certain protocol encoder devices such as digital camera 110 may forego or implement different hardware components than are described in FIG. 7.

Server computer 105 may be configured with a Windows® brand operating system. The server computer 105 includes a processing unit 705, a system memory 710, and a system bus 715 that interconnects various system components, including the system memory 710 to the processing unit 705. The system bus 715 may be implemented as any one of several bus structures and using any of a variety of bus architectures, including a memory bus or memory controller, a peripheral bus, and a local bus.

The system memory 710 includes read only memory (ROM) 720 and random access memory (RAM) 725. A basic input/output system 730 (BIOS) is stored in ROM 720.

The server computer 105 has one or more of the following drives: a hard disk drive 730 for reading from and writing to a hard disk or hard disk array, a magnetic disk drive 735 for reading from or writing to a removable magnetic disk 740, and an optical disk drive 745 for reading from or writing to a removable optical disk 750 such as a CD ROM or other optical media. The hard disk drive 730, magnetic disk drive 735, and optical disk drive 745 are connected to the system bus 715 by a hard disk drive interface 760, a magnetic disk drive interface 765, and an optical drive interface 770, respectively. The drives and their associated computer-readable media provide nonvolatile storage of computer readable instructions, data structures, program modules and other data for server computer 105.

Although hard disk 730, removable magnetic disk 735, and removable optical disk 750 are described, other types of computer readable media can be used to store data. Other such media include magnetic cassettes, flash memory cards, digital video disks, Bernoulli cartridges, random access memories (RAMs), read only memories (ROMs), and the like. Additionally, the server computer 105 may be configured to serve data stored on an independent system, such as a RAID (redundant array of independent disks) storage system, particularly when implemented as a terminal server.

A number of program modules may be stored on the hard disk 730, magnetic disk 735, optical disk 750, ROM 720, or RAM 725. The programs include a server operating system 775, one or more application programs 780, other program modules 782, and program data 784.

A user may enter commands and information into the server computer 105 through input devices such as keyboard 786 and a mouse 788. Other input devices (not shown) may include a microphone, joystick, game pad, satellite dish, scanner, and the like. These and other input devices, such as the graphics source 125 of FIG. 1, are connected to the processing unit 705 through a serial port interface 790 that is coupled to the system bus 715, but may alternatively be connected by other interfaces, such a parallel port, game port, or a universal serial bus (USB).

A monitor 792 or other type of display is also connected to the system bus 715 via an interface, such as a video adapter card 794. The server computer 105 has a network interface or adapter 796, a modem 798 or other means for establishing communications over the network 115, such as an Internet connection. The modem 798 may also facilitate connection from a protocol decoder device. Monitor 792 and input devices such as keyboard 786 and mouse 788 may be grouped and considered as a display device, such as display device 135 of FIG. 1.

CONCLUSION

The above-described server computer provides higher-level graphics commands to protocol decoder devices through a portable graphics encoder that may be implemented by various operating systems and platforms. The higher-level graphics commands are encoded as to a particular format defined by a communication protocol used between graphics encoder and the one or more protocol decoder devices. Although the invention has been described in language specific to structural features and/or methodological acts, it is to be understood that the invention defined in the appended claims is not necessarily limited to the specific features or acts described. Rather, the specific features and acts are disclosed; as exemplary forms of implementing the claimed invention.

What is claimed is:

1. A method of sending encoded higher-level graphics, the method being implemented by one or more processors executing computer-executable instructions stored in computer-readable storage media, the method comprising:

providing a protocol compliant state machine in association with an encoder implemented by one or more of the processors at a first device, said protocol compliant state machine being dedicated for communication over a network with a protocol decoder device;

negotiating graphics encoding parameters by said protocol compliant state machine with the protocol decoder device based on a specified communication protocol for establishing a negotiated set of graphics encoding parameters for the protocol decoder device, the negotiating further comprising establishing access privileges of the protocol decoder device to provide inputs to an application program at a graphics source in communication with the encoder;

receiving a request for higher-level graphics commands representing graphics data at the protocol compliant state machine from the protocol decoder device;

passing the request to the encoder, said encoder including a replaceable operating system specific input translator compatible with a first operating system of the first device;

translating the received request by the translator into commands specific to the first operating system of the first device;

extracting the higher-level graphics commands from the application program at the graphics source using an injection application program interface (API);

injecting the higher-level graphics commands to the encoder by the injection API;

encoding, by the encoder implemented by the one or more processors, the injected higher-level graphics commands into communication protocol data units (PDUs) representative of the higher-level graphics commands;

passing the encoded communication protocol specific PDUs to the dedicated protocol compliant state machine; and sending the communication protocol specific PDUs from the dedicated protocol compliant state machine to the protocol decoder device in accordance with the negotiated set of graphics encoding parameters.

2. The method of claim 1 wherein the encoding and sending is based on remote desktop protocol (RDP).

3. The method of claim 1 further comprising replacing the operating system specific input translator when the encoder is ported over to a second operating system, different from said first operating system, with a replacement translator compatible with the second operating system, whereby the encoder is portable between different operating systems.

4. The method of claim 1 wherein the sending the PDUs is through a stream oriented connection established between the protocol decoder device and the dedicated protocol compliant state machine at the encoder, said stream oriented connection being established following the negotiation of the compression, encryption or graphics encoding parameters between the dedicated protocol compliant state machine and the protocol decoder device.

5. The method of claim 1, further comprising, providing a plurality of the protocol compliant state machines, each protocol compliant state machine being dedicated for communication with a respective corresponding one of a plurality of the protocol decoder devices, each protocol compliant state machine negotiating a different set of graphics encoding parameters for each respective corresponding protocol decoder device.

6. The method of claim 5, the establishing access privileges further comprising each protocol compliant state machine establishing access privileges for the respective protocol decoder device for providing a first subset of the protocol decoder devices access to provide inputs, while a second subset of the protocol decoder devices has access limited to receiving the higher-level graphics commands.

7. The method of claim 1 further comprising packaging the PDUs into lower level protocol units defined and formatted per the particular communication protocol prior to sending the PDUs to the protocol decoder device.

8. The method of claim 1 further comprising: receiving protocol decoder device communication PDUs representing inputs to the application, translating the inputs using the operating system specific input translator into additional commands specific to the first operating system, wherein the higher-level graphics commands from the application are affected by the inputs.

9. A system comprising:

a memory storing an application at a graphics source that includes higher-level graphics commands representing graphics data;

a protocol encoder device implemented by a processor and in communication with the graphics source;

a protocol compliant state machine implemented at the protocol encoder device, said protocol compliant state machine being dedicated for communication over a network with a protocol decoder device, the protocol compliant state machine negotiating graphics encoding parameters with the protocol decoder device based on properties of the protocol decoder device and a specified communication protocol when communication is established between the protocol encoder device and the protocol decoder device, the protocol compliant state machine establishing access privileges of the protocol decoder device to provide inputs to an application program at the graphics source;

a communication protocol specific encoder implemented at the protocol encoder device to encode the higher-level graphics commands into communication protocol specific protocol data units (PDUs) based on the specified communication protocol and pass the PDUs to the protocol compliant state machine; and the protocol compliant state machine at the protocol encoder device sending the encoded PDUs over the network to the protocol decoder device in accordance with the negotiated graphics encoding parameters.

10. The system of claim 9 further comprising a plurality of the protocol compliant state machines, each protocol compliant state machine being dedicated for communication with a respective corresponding one of a plurality of the protocol decoder devices, each protocol compliant state machine negotiating a different set of graphics encoding parameters for the respective corresponding protocol decoder device.

11. The system of claim 10, further comprising each protocol compliant state machine being configured to access privileges for the respective protocol decoder device for providing a first subset of the protocol decoder devices access to provide inputs, while a second subset of the protocol decoder devices has access limited to receiving the higher-level graphics commands.

12. The system of claim 11, further comprising an operating system specific input translator configured to be replaced with a replacement translator compatible with a second operating system, different from said first operating system, when the communication protocol specific encoder is ported over to the second operating system, whereby the communication protocol specific encoder is portable between different operating systems.

13. The system of claim 9 wherein the graphics source is configured to receive input commands from the protocol decoder device after the commands are received by the protocol encoder device and translated by the operating system specific input translator.

14. A non-transitory storage medium having processor-executable instructions that, when executed on a first device, cause the first device to perform operations comprising:
providing a plurality of protocol compliant state machines in association with an encoder implemented by one or more processors at the first device, each said protocol compliant state machine being dedicated for communication over a network with a respective corresponding protocol decoder device of a plurality of protocol decoder devices in communication with the encoder;
negotiating graphics encoding parameters by each said protocol compliant state machine with the respective corresponding protocol decoder device based on a specified communication protocol for establishing a different set of negotiated graphics encoding parameters for each protocol decoder device;
receiving a request for higher-level graphics commands representing graphics data at one or more of the protocol compliant state machines at the first device;
encoding higher-level graphics commands by the encoder into protocol data units (PDUs) based on the specified communication protocol;
passing the PDUs to the plurality of dedicated protocol compliant state machines; and
sending the encoded PDUs from each dedicated protocol compliant state machine to the respective protocol decoder device in accordance with the different set of negotiated graphics encoding parameters negotiated for each respective protocol decoder device.

15. A non-transitory storage medium as recited in claim 14, the negotiating further comprising authorizing communication with each protocol decoder device via the corresponding dedicated protocol compliant state machine for determining access privileges of each protocol decoder device, a first subset of the protocol decoder devices being authorized to provide inputs, and a second subset of the protocol decoder devices having access limited to receiving the higher-level graphics commands.

16. A non-transitory storage medium as recited in claim 14 further comprising:
providing with the encoder a replaceable operating system specific input translator compatible with a first operating system of the first device; and
translating the received request by the translator into commands specific to the first operating system.

17. A method of transmitting higher-level graphics commands, the method being implemented by one or more processors executing computer-executable instructions stored in computer-readable storage media, the method comprising:
providing a plurality of dedicated protocol compliant state machines as part of an encoder implemented by one or more of the processors at a first device, each said protocol compliant state machine being dedicated for communication over a network with a respective corresponding protocol decoder device of a plurality of protocol decoder devices in communication with the encoder;
negotiating graphics encoding parameters by each said protocol compliant state machine with the respective corresponding protocol decoder device based on properties of each protocol decoder device and a specified communication protocol for providing different negotiated graphics encoding parameters to each protocol decoder device;
receiving a request for higher-level graphics commands representing graphics data at one or more of the protocol compliant state machines;
encoding, by the encoder implemented by the one or more of the processors, the higher-level graphics commands into protocol data units (PDUs) based on a specified communication protocol;
passing the PDUs to the plurality of protocol compliant state machines; and
sending the PDUs from each of the protocol compliant state machines to the respective corresponding protocol decoder devices according to the different negotiated graphics encoding parameters for each respective protocol decoder device.

18. The method as recited in claim 17, further comprising authorizing communication with the plurality of protocol decoder devices via the corresponding protocol compliant state machines prior to sending the PDUs to the one or more protocol decoder devices, one or more first protocol decoder devices of the plurality of protocol decoder devices being authorized to provide inputs, and one or more second protocol decoder devices of the plurality of protocol decoder devices having access limited to receiving the higher-level graphics commands.

19. The method as recited in claim 17 further comprising replacing the operating system specific input translator with a replacement translator compatible with a second operating system, different from the first operating system, when the encoder is ported over to the second operating system, whereby the encoder is portable between different operating systems.

* * * * *